United States Patent
Messie et al.

(10) Patent No.: US 12,531,876 B2
(45) Date of Patent: Jan. 20, 2026

(54) METHOD FOR MANAGING A LOCAL LEDGER OF A NODE BELONGING TO A SET OF NODES CONTRIBUTING TO A DISTRIBUTED LEDGER

(71) Applicant: Orange, Issy-les-Moulineaux (FR)

(72) Inventors: Vincent Messie, Chatillon (FR); Benoit Radier, Chatillon (FR); Gaël Fromentoux, Chatillon (FR); Arnaud Braud, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 125 days.

(21) Appl. No.: 18/565,362

(22) PCT Filed: May 16, 2022

(86) PCT No.: PCT/FR2022/050922
§ 371 (c)(1),
(2) Date: Nov. 29, 2023

(87) PCT Pub. No.: WO2022/254117
PCT Pub. Date: Dec. 8, 2022

(65) Prior Publication Data
US 2024/0283799 A1 Aug. 22, 2024

(30) Foreign Application Priority Data
May 31, 2021 (FR) ...................... 2105671

(51) Int. Cl.
*H04L 9/00* (2022.01)
*H04L 9/40* (2022.01)

(52) U.S. Cl.
CPC .......... *H04L 63/123* (2013.01); *H04L 63/126* (2013.01)

(58) Field of Classification Search
None
See application file for complete search history.

(56) References Cited

U.S. PATENT DOCUMENTS

| 11,222,011 B2 * | 1/2022 | Yang ................... G06F 16/2246 |
| 2019/0238319 A1 * | 8/2019 | Beck .................... H04L 9/3239 |
| 2021/0365433 A1 * | 11/2021 | Heo .................... G06F 16/2365 |

FOREIGN PATENT DOCUMENTS

| CN | 112015817 A | 12/2020 |
| GB | 2587541 A | 3/2021 |

OTHER PUBLICATIONS

Serguei Popov et al., "The Coordicide", Jan. 2020, published by the IOTA Foundation, accessible with the following url: https://us01.z.antigena.com/l/ZrOnwcBQwLwlZh3AubE6N4SXgp2KvoCQPIdl5w3-2zcUJWI_sx91~YWJcp4gw-ca2ewyS-41gioJIYUY17et4gnG1gJT93xu3EGyKmve5CV5Pk3vbQ8wbQCTF8H8xx1IFqdQcK2qQnZDFh6r6S6I2Lw6P8w5JGrQ1Zxvnv_jc9E3M5~ulI1upIA~2mB.

(Continued)

*Primary Examiner* — Nelson S. Giddins
(74) *Attorney, Agent, or Firm* — Knobbe, Martens, Olson & Bear, LLP

(57) ABSTRACT

In known implementations of distributed ledgers, all of the transactions linked to a service are archived in nodes involved in the implementation of the service. This makes it possible to verify the authenticity and the integrity of the transactions and to ensure that the service that is provided is compliant. This poses a problem for nodes having limited storage capacities, some ledgers possibly reaching a significant size and ultimately potentially making it impossible for some modes to be able to record new transactions, thus causing a problem in terms of controlling the actual execution of the operations linked to these transactions. The present solution allows some nodes involved in the implementation of a service to be able to empty their local ledgers without this jeopardizing the correct operation of the asso- (Continued)

ciated distributed ledger. The transparency and the permanence of the transactions relating to the service are thus guaranteed.

15 Claims, 3 Drawing Sheets

(56) References Cited

OTHER PUBLICATIONS

Florian Martin et al., "Erasing Data from Blockchain Nodes" 2019 IEEE European Symposium on Security and Privacy Workshops (Euros & PW), IEEE, Jun. 17, 2019, pp. 367-376.
Satoshi Nakamoto, "Bitcoin: A Peer-to-Peer Electronic Cash System", www.bitcoin.org, p. 1-9, Oct. 2008, published at (https://bitcoin.org/bitcoin.pdf).
Vitalik Buterin, "Ethereum: A Next-Generation Smart Contract and Decentralized Application Platform", www.Ethereum.org, p. 1-36, Dec. 2014, published on ethereum.org (https://ethereum.org/669c9e2e2027310b6b3cdce6e1c52962/Ethereum_Whitepaper_-_Buterin_2014.pdf).
International Search Report for International Application No. PCT/FR2022/050922, dated Sep. 20, 2022.
Written Opinion of the International Search Authority for International Application No. PCT/FR2022/050922, dated Sep. 20, 2022.

\* cited by examiner $N_1$-$N_N$ $N_A$

METHOD FOR MANAGING A LOCAL LEDGER OF A NODE BELONGING TO A SET OF NODES CONTRIBUTING TO A DISTRIBUTED LEDGER

CROSS-REFERENCE TO RELATED APPLICATIONS

This application is filed under 35 U.S.C. § 371 as the U.S. National Phase of Application No. PCT/FR2022/050922 entitled "Method for Managing a Local Ledger of a Node Belonging to a Set of Nodes Contributing to a Distributed Ledger" and filed May 16, 2022, and which claims priority to FR 2105671 filed May 31, 2021, each of which is incorporated by reference in its entirety.

BACKGROUND

Field

The field of the development is that of distributed ledgers. More specifically, the development relates to a solution for managing local copies of these distributed ledgers allowing guaranteeing trust and consensus between the different nodes involved in the implementation of a service while taking account of the storage constraints inherent to such a technology.

Prior Art and Its Drawbacks

A distributed (or shared) ledger is a ledger simultaneously recorded and synchronized in a plurality of communication entities, or nodes, belonging to one or more communication network(s). Such a distributed ledger sees its content evolve only by the addition of new transactions validated beforehand by consensus by all of the nodes in which the distributed ledger is memorized. Such transactions cannot, in principle, be modified or deleted from the distributed ledger. A distributed ledger has no central administrator or centralized data storage. Finally, a consensus algorithm is necessary to ensure the operation of the distributed ledger.

Although known primarily for their use in the field of cryptocurrencies, distributed ledgers are also used in the field of execution of smart contracts as introduced by the decentralized exchange protocol Ethereum and can for example be used in communication infrastructures from which value-added services are offered.

In general, in known implementations of distributed ledgers, and in particular distributed ledgers used in the field of cryptocurrencies, all of the transactions related to the provided service are archived in the nodes and accessible thanks to browsers implemented on some nodes dedicated for this use. This allows anyone at any time to verify the authenticity and integrity of the transactions and therefore ensuring that the provided service is compliant.

Indeed, the proper execution of a distributed ledger involves archiving and memorizing all of the exchanged transactions in each node contributing to a service for which the transactions are recorded, in order to guarantee the transparency and permanence of the operations performed therein.

This poses a problem for nodes having limited storage capacities, some ledgers being able to reach a large size and ultimately being able to make it impossible for some nodes to record new transactions, thereby causing a problem in controlling the actual execution of the operations related to these transactions.

Hence, there is a need for a solution allowing addressing these problems of limited storage of some nodes.

SUMMARY

The development addresses to this need by providing a method for managing a local ledger of a node belonging to a set of nodes contributing to the implementation of a service, said local ledger memorizing at least one first transaction comprising data generated during an execution, by said node, of a function contributing to the implementation of said service and at least one parameter proving the validity of the transaction and allowing adding said first transaction in a distributed ledger memorizing all of the transactions relating to the implementation of said service, said method comprising the following steps implemented by said node:
  receiving a message comprising an authorization to empty the contents of the local ledger, said message being emitted by a node, called archivist node, memorizing in its own local ledger a copy of the transactions recorded in the distributed ledger,
  prior to emptying of said local ledger, recording a copy of a last state of the local ledger, and
  generating a second transaction serving as a reference transaction for the transactions intended to be memorized in the local ledger following the emptying, the data comprised in said second transaction depending on said copy of the last state of the local ledger.

Such a solution enables some nodes involved in the implementation of a service to empty their local ledgers without affecting the proper operation of the associated distributed ledger. Thus, the transparency and the permanence of the transactions relating to said service are guaranteed.

Several entities, such as telecommunications service providers or operators for example, having worked together to provide an end-to-end service, can then operate specialized nodes, called archivist nodes, in charge of memorizing in their local ledgers all transactions relating to the implementation of the service.

In such a solution, the involved entities are able to empty their local ledgers after having certified the integrity of their content by consensus, having consolidated them and no longer need them to verify that the service has actually been delivered in accordance with the specifications negotiated between the entities prior to implementation thereof. The method also allows nodes, having little capacities in terms of memory, to contribute to a service and record transactions related to this service by authorizing emptying of the resources memorizing the transactions via archivist nodes with greater capacities. This possibility is implemented while ensuring that no transaction data is deleted or not kept in a node, even the node participating to the service or the archivist node.

According to a particularly of the management method of the development, the latter comprises a step of verifying the authenticity of said message comprising an authorization to empty the contents of the local ledger by means of a reference transaction memorized in the distributed ledger, said reference transaction comprising at least one identifier of at least one authorized archiving node.

Only a duly authenticated message can trigger emptying of the local ledger, thereby avoiding affecting the integrity of the distributed ledger and ensuring that emptying is not executed following reception of a fraudulent message and thus avoiding the corruption of the recorded data or deletion thereof.

According to a particularity of the management method of the development, the message comprising an authorization to empty the contents of the local ledger is comprised in a transaction memorized in the distributed ledger.

Thus, a reliable trace of successive archivings is accessible and allows tracing back a history of the distributed ledger.

According to a particularly of the management method of the development, the latter comprises an emission step, to at least one archivist node, requesting authorization to empty a local ledger.

For example, a node may emit such a message if a storage limit of its local ledger is reached, or if transactions relating to the function executed by the node should be emptied from the local ledger for security reasons or if the node is terminating or about to terminate its contribution to the service.

According to a particularly of the management method of the development, the latter further comprises:
- a step of verifying at least one condition for triggering emptying of said local ledger, the verification of said condition triggering the implementation of the step of recording a copy of a last state of the local ledger.

The reception of the message does not necessarily trigger emptying of the local ledger. Indeed, only some nodes could need to empty their local ledger. Thus, the possibility of emptying the local ledger is left to the discretion of each node according to its own constraints (memory, security, architecture).

According to a particularly of the management method of the development, said message comprising an authorization to empty the contents of the local ledger also comprises an identifier of said function.

Thus, emptying the local ledger may concern only some transactions memorized therein. Thus, it is possible to provide for only some data, relating to a function and possibly to a given service, to be memorized by the archivist node at a given time point.

According to a particularly of the management method of the development, the reception of said message comprising an authorization to empty the contents of the local ledger triggers the execution of an archiving function leading to emptying of said local ledger.

According to a particularly of the management method of the development, said archiving function executed by said node is a smart contract.

The development also relates to a method for managing a distributed ledger memorizing all of the transactions relating to a service implemented by a set of nodes, a node executing at least one function contributing to the implementation of said service and comprising a local ledger memorizing at least one first transaction comprising data generated during an execution of said function and at least one parameter proving the validity of the transaction and allowing adding said first transaction in the distributed ledger, said method comprising the following steps implemented by a node, so-called archivist node, memorizing in its own local ledger a copy of the distributed ledger:
- detecting a triggering event relating to the distributed ledger,
- in response to the detection of said triggering event, broadcasting, to the nodes contributing to the implementation of said service, a message comprising an authorization to empty the contents of the local ledger of said nodes,
- memorizing, in its own local ledger, a new reference transaction of the nodes having emptied their local ledger.

Such an archivist node ensures the proper management of the distributed ledger by ensuring that all transactions relating to a given service are memorized in the distributed ledger and by ensuring that each node involved in the implementation of the service is capable of: guaranteeing the transparency and permanence of the transactions relating to said service and at the same time managing the storage capabilities of its local ledger as best as possible.

According to a particularly of the method for managing a distributed ledger of the development, the triggering event belongs to the group comprising, inter alia:
- a regular time interval,
- the reception of a message, emitted by at least one of the nodes, requesting authorization to empty a local ledger,
- a time schedule,
- a number of transactions memorized in the distributed ledger,
- a limit storage volume,
- an update of the function to be executed,
- the addition of a node to the set of nodes,
- the deletion of a node from the set of nodes,
- the addition of an archivist node,
- the deletion of an archivist node.

The development also relates to a node belonging to a set of nodes contributing to the implementation of a service, and comprising a local ledger memorizing at least one first transaction comprising data generated during an execution, by said node, of a function contributing to the implementation of said service and at least one parameter proving the validity of the transaction and allowing adding said first transaction in a distributed ledger memorizing all of the transactions relating to the implementation of said service, said node comprising means for:
- receiving a message comprising an authorization to empty the contents of the local ledger, said message being emitted by a node, called archivist node, memorizing in its own local ledger a copy of the transactions recorded in the distributed ledger,
- prior to emptying of said local ledger, recording a copy of a last state of the local ledger, and
- generating a second transaction serving as a reference transaction for the transactions intended to be memorized in the local ledger following the emptying, the data comprised in said second transaction depending on said copy of the last state of the local ledger.

The development also relates to an archivist node memorizing in its own local ledger a copy of a distributed ledger memorizing all of the transactions relating to a service implemented by a set of nodes, a node executing at least one function contributing to the implementation of said service and comprising a local ledger memorizing at least one first transaction comprising data generated during an execution of said function and at least one parameter proving the validity of the transaction and allowing adding said first transaction in the distributed ledger, said archivist node comprising means for:
- detecting a triggering event relating to the distributed ledger,
- in response to the detection of said triggering event, broadcasting, to the nodes contributing to the implementation of said service, a message comprising an authorization to empty the contents of the local ledger of said nodes, memorizing, in its own local ledger, a new reference transaction of the nodes having emptied their local ledger.

Finally, the development relates to computer program products comprising program code instructions for the implementation of the methods as described before, when executed by a processor.

The development also relates to a computer-readable recording medium on which computer programs are recorded comprising program code instructions for the execution of the steps of the methods according to the development as described hereinabove.

Such a recording medium may be any entity or device capable of storing the programs. For example, the medium may include a storage means, such as a ROM, for example a CD ROM or a microelectronic circuit ROM, or else a magnetic recording means, for example a flash disk or a hard disk.

On the other hand, such a recording medium may be a transmissible medium such as an electrical or optical signal, which may be conveyed via an electrical or optical cable, by radio or by other means, so that the computer programs contained therein can be executed remotely. In particular, the programs according to the development may be downloaded onto a network, for example the Internet network.

Alternatively, the recording medium may be an integrated circuit in which the programs are incorporated, the circuit being adapted to execute or to be used in the execution of the aforementioned methods of the development.

BRIEF DESCRIPTION OF THE DRAWINGS

Other aims, features and advantages of the development will appear more clearly upon reading the following description, given merely as an illustrative and non-limiting example, with reference to the figures, wherein.

DETAILED DESCRIPTION OF CERTAIN ILLUSTRATIVE EMBODIMENTS

The general principle of the development is based on the instantiation of archivist nodes memorizing in their local ledger all of the transactions relating to a function executed by a node belonging to a set of nodes involved in the implementation of a service.

Depending on the circumstances, such an archivist node authorizes the concerned nodes to empty all or part of the transactions memorized in their local ledgers in particular in order to clear storage space.

Such a solution also has the advantage of preserving the transparency and permanence of the transactions relating to said service and thus allowing continuing to offer the service in accordance with the conditions proposed and accepted by users of the service.

Hence, the solution of the present development allows profiting from the advantages of the distributed ledgers, namely security with regards to the authenticity and integrity of the transactions without a controlling authority, without any risk of causing the impossibility for some nodes to record new transactions thereby causing a problem in controlling the actual execution of the operations related to these transactions.

Figure 1:
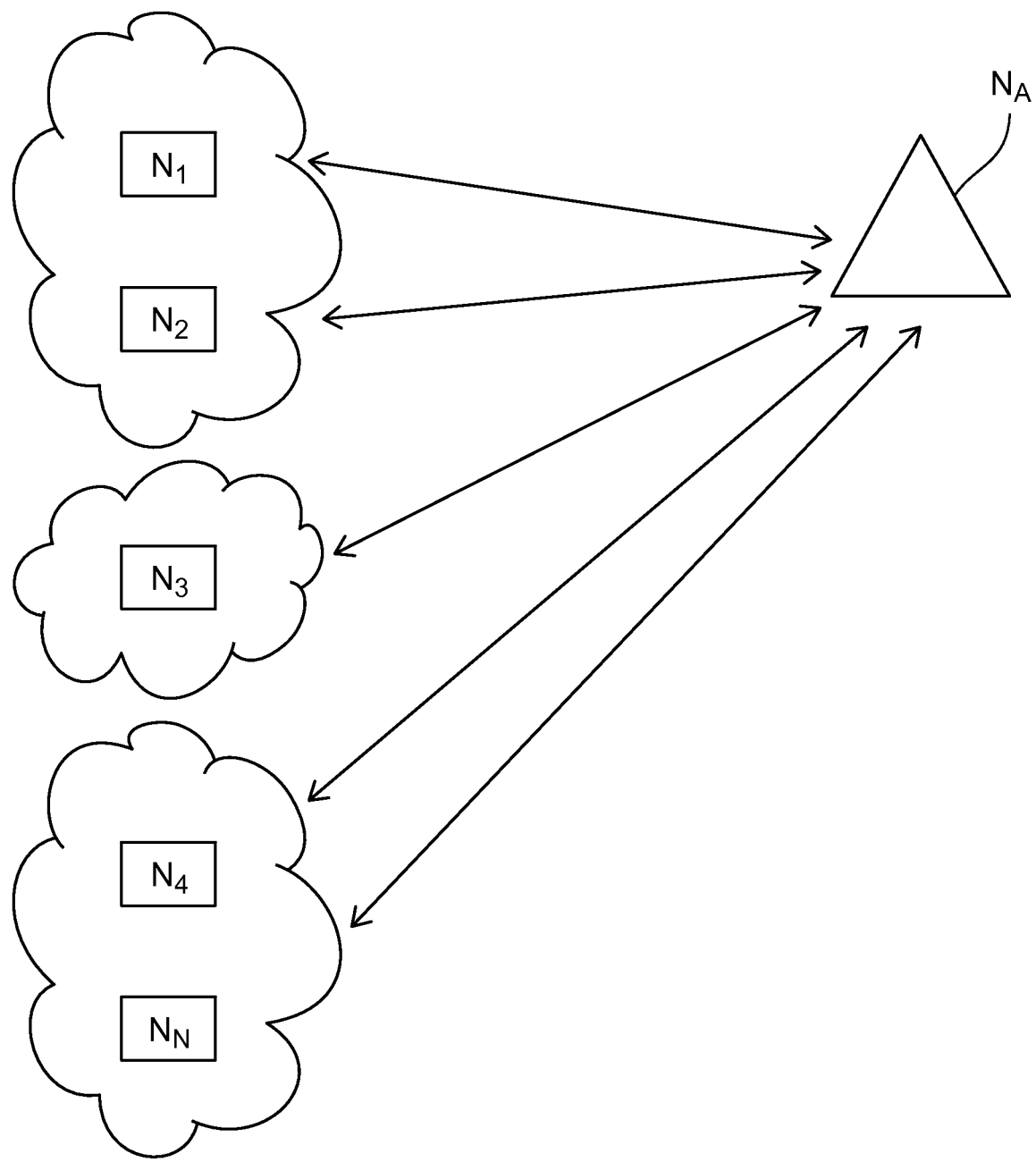
FIG. 1 shows a system wherein the management methods of the present development are implemented.

Referring to FIG. 1, a system is now described in which the management methods of the present development are implemented.

Such a system comprises a plurality of nodes $N_1$-$N_N$ and an archivist node $N_A$. Of course, such a system may comprise several archivist nodes $N_A$.

Without limitation, the nodes $N_1$-$N_N$ may consist of communication equipment such as servers, routers, base stations such as eNodeB in accordance with 4G or gNB in 5G, gateways interconnecting different communications networks, optical line terminations or OLTs, or fixed or mobile terminals contributing to the implementation of a service, etc. Such nodes $N_1$-$N_N$ may belong to the same communication network managed by a first telecommunications operator or may belong to different communication networks, managed, or not, by different telecommunications operators. Such communication equipment has storage means enabling them to memorize in a dedicated local ledger a set of transactions performed by said node and related to the implementation of one or more given service (s).

Just like the nodes $N_1$-$N_N$, the archivist node $N_A$ is a piece of communication equipment. It may itself actually contribute, or not, to the provision of the service and/or be a node specifically intended for archiving transaction data for one or more node(s) contributing to the provision of a communications service for which transactions should be saved. The only constraint that such communication equipment should comply with is to have a storage capacity that is large enough to enable the storage of a copy of a distributed ledger memorizing all of the transactions performed by said nodes $N_1$-$N_N$ related to the implementation of the service. It is also possible to imagine that nodes in charge of data archiving themselves need to archive their data at some time points with archivist nodes having larger storage capacities.

In the present document, the term transaction refers to an entry of a distributed ledger relating to a given service. A transaction is typically the result of the execution of a function, such as the emission, the reception, or specific data processing of the service, executed by a node participating to the implementation of a given service. Such a transaction is validated by all of the participating nodes according to rules defined beforehand by all entities, such as telecommunications operators and/or service providers, managing the participating nodes and the service. Then, the transaction is frozen thanks to cryptographic primitives before being added to the distributed ledger.

Figure 2:
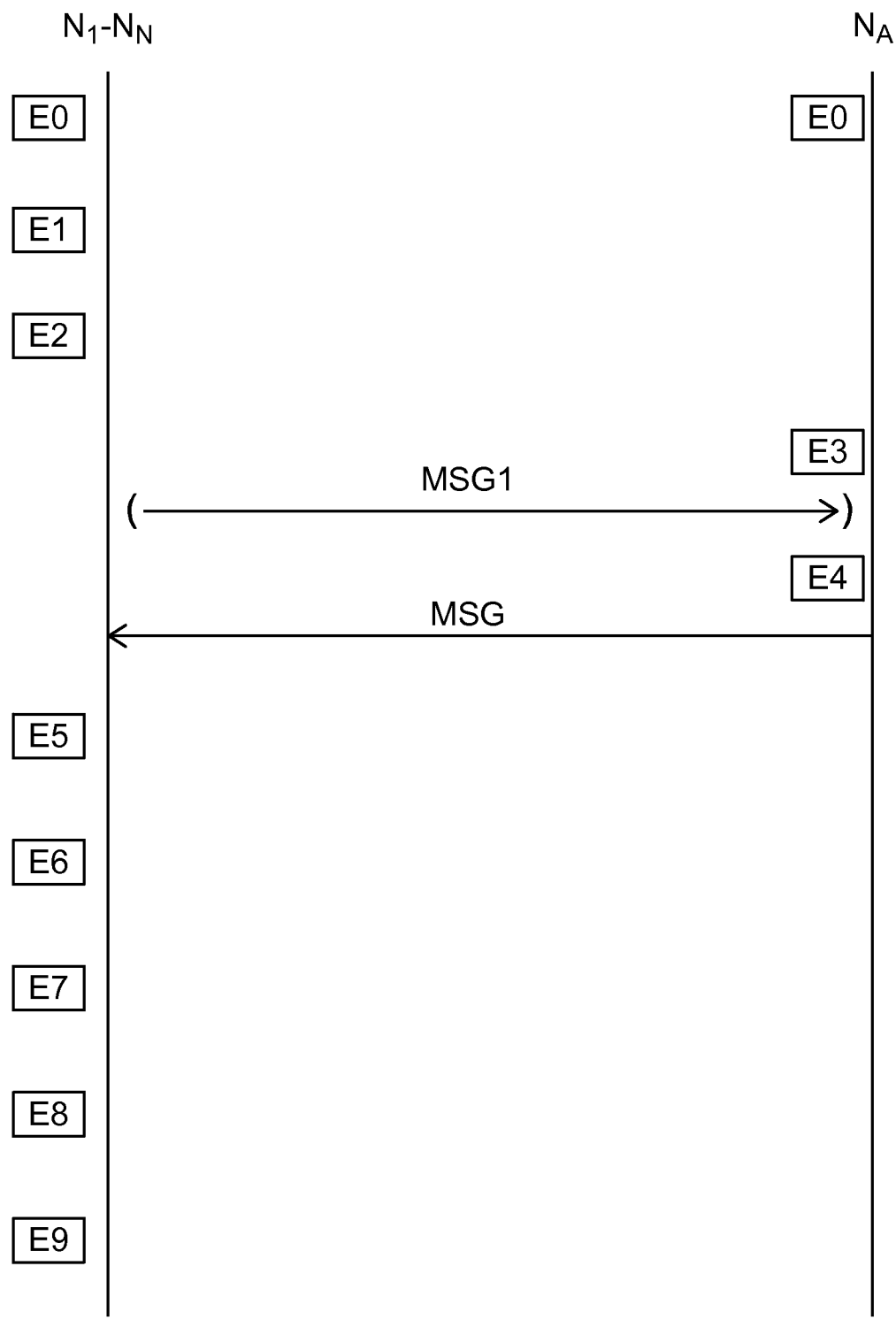
FIG. 2 shows the different steps of the management methods implemented by the different nodes involved in the implementation of the service.

FIG. 2 shows the different steps of the management methods implemented by the different nodes $N_1$-$N_N$, $N_A$, involved in the implementation of the service.

Prior to the implementation of the different steps of the management methods, different entities, such as telecommunications operators and/or service or content providers, agree on the implementation conditions of a service such as an end-to-end connectivity service.

Thus, a plurality of nodes $N_1$-$N_N$ belonging to the different entities exchange data in a secure manner, by means of transactions, in order to ensure the implementation of the service by collecting and by processing data associated with different functions executed by the different nodes $N_1$-$N_N$.

Such functions may be in the form of smart contracts which allow certifying the integrity of the data produced during execution thereof by a node. The produced data are then exchanged, then recorded in the form of transactions which are then archived in the distributed ledger.

The different entities also agree on a transaction archiving procedure common to all nodes $N_1$-$N_N$, enabling these to empty, partially or not, the history of transactions memorized in their local ledger in order to clear storage space.

For this purpose, at least one archivist node $N_A$ is designated by the entities prior to the implementation of the service. New archivist nodes $N_A$ may be designated during the implementation of the service, as well as some archivist nodes may stop being used as such. Archivist nodes may also be assigned to saving data for some types of services or for specific transactions or when some types of data should be saved in an archivist node $N_A$, for example to take account of security requirements.

The entities also decide on the instantiation of an archiving function, intended to be executed by the nodes $N_1$-$N_N$ and the archivists node $N_A$. Such an archiving function corresponds to the management methods of the development.

In a step E0, an archiving function related to a service is provided to all of the nodes $N_1$-$N_N$ and the archivist nodes $N_A$ involved in the implementation of a given service and in the management of the distributed ledger associated therewith. Amongst the parameters of this archiving function, there is an identifier of the archivist node $N_A$.

A list of the archivist nodes $N_A$ is established upstream by the entities involved in providing the service, and may include archivist nodes $N_A$ belonging to a trusted third party like a regulatory authority or an auditor, or to either one of the entities. A transaction validating the archiving function is then recorded in the distributed ledger. Such a transaction sets the conditions for the execution of this archiving function and subsequently serves as a reference transaction by all or part of the nodes $N_1$-$N_N$ when they implement the archiving function.

The presence of this identifier of the archivist node $N_A$ enables the nodes $N_1$-$N_N$ to authenticate the archivist node $N_A$ in a secure manner.

Thus, in an exemplary implementation, one node amongst the nodes $N_1$-$N_N$ is configured to instantiate the archiving function, thereby becoming an archivist node $N_A$. This archivist node $N_A$ transmits its identifier to the other nodes $N_1$-$N_N$ so that this information could be used to identify the archiving function during the execution of the archiving function.

In another exemplary implementation, the archiving function may also be deployed in a centralized and secure environment such as a Gaia-X node, an IDSA connector, or a secure cloud, accessible by the different nodes $N_1$-$N_N$. In order to be able to access the function in order to execute it, an identifier of the archiving function, such as an Ethereum contract address, is provided to the nodes $N_1$-$N_N$ and memorized in the local ledger of these nodes.

In a step E1, the nodes $N_1$-$N_N$ execute at least one function relating to the implementation of the service provided by the entities. The execution of this function by a node $N_N$ generates data, or "Usage Report", intended to be shared with at least one other node $N_1$-$N_N$ contributing to the implementation of the service.

The data thus obtained is exchanged with the concerned nodes $N_1$-$N_N$ in the form of a transaction. Thus, in a step E2, once the transaction has been validated by all of the nodes $N_1$-$N_N$ and frozen thanks to cryptographic primitives, it is memorized in the local ledger of the node $N_N$ before being added to the distributed ledger.

Such a transaction includes, inter alia, data specific to the used ledger technology, an identifier of a node emitting said transaction accompanied by a digital signature to authenticate the latter, an identifier of a recipient of said transaction, such as another node or a smart contract such as the smart contract corresponding to the archiving function, a parameter allowing proving the validity of the transaction, such as the result of a cryptographic calculation, parameters allowing chaining the transaction with the previous transactions such as a hash of a block comprising a plurality of previous transactions, etc.

In a step E3, the archivist node $N_A$ collects the transactions added to the distributed ledger by the nodes $N_1$-$N_N$ in order to archive them and thus ensure preservation thereof according to terms set out beforehand by the entities providing the service. Such a collection may be carried out continuously, at regular time intervals, or in response to a particular event such as the reception of a message emitted by one of the nodes $N_1$-$N_N$ informing, for example, on the generation or the validation of a new transaction. Thus, the archivist node is provided with an up-to-date copy of the distributed ledger memorized in its local ledger.

In a step E4, the archivist node $N_A$ broadcasts to all nodes $N_1$-$N_N$ a message MSG comprising an authorization to empty the contents of the local ledger of the nodes $N_1$-$N_N$. In a particular embodiment, the message MSG is comprised in a transaction memorized in the distributed ledger. Thus, the distributed ledger comprises traces of successive archiving requests, which allows having an accurate history of the management actions performed on the distributed ledger.

The emission of such a message MSG may be triggered by different events.

Thus, such a message MSG may be emitted at regular time intervals, for example every 30 seconds, at a particular time, and/or when a number of transactions memorized in the distributed ledger has been reached, for example every 1,000 transactions, and/or when a limit storage volume is reached, for example when the volume of memorized transactions reaches one TB (terabytes), and/or when an update of the function to be executed is available, and/or in case of addition of a node $N_M$ to the set of nodes $N_1$-$N_N$, and/or in case of deletion of a node from the set of nodes $N_1$-$N_N$, and/or in case of addition or deletion of an archivist node, etc.

In a particular embodiment, the transmission of the message MSG is triggered by the reception of a message MSG1 asking the archivist node for authorization to empty a local ledger. The message MSG1 is emitted by a node $N_1$-$N_N$, for example in response to the detection of reaching a limit storage volume of said local ledger or for a security or availability problem that could erase some data from the ledger. In this embodiment, the archivist node $N_A$ may proceed with a verification of the authenticity of said message MSG1. For this purpose, the node $N_A$ uses, for example, a previous transaction generated by the node $N_1$-$N_N$ having emitted the message MSG1 and memorized in the distributed ledger.

The message MSG emitted by the archivist node $N_A$ comprises, inter alia, an identifier of the function relating to the provided service enabling the nodes $N_1$-$N_N$ to determine which transactions memorized in their local ledger are subject to the archiving procedure.

Following reception of the message MSG, in a step E5, the node $N_N$ proceeds according to one example with a verification of the authenticity of said message MSG. For this purpose, the node $N_N$ uses the reference transaction defined during step E0 and memorized in the distributed ledger.

Once the authenticity of the message MSG has been verified, the node $N_N$ determines, in a step E6, whether the conditions for emptying its local ledger are met or not. For example, such a condition consists in reaching a limit storage volume of the local ledger of node $N_N$, or a limit number of transactions relating to a given function, or the expiration of a limit storage duration, for example not keeping a transaction in memory for more than 48 h.

If one or more emptying condition(s) are met, the node $N_N$ then proceeds with the record of a copy of a last state of its local ledger in a step E7.

Thus, all data memorized in the local ledger prior to recording of this last state of the local ledger may be deleted, thereby clearing storage volume.

This record is stored in the local ledger of the node $N_N$ and, optionally, in the distributed ledger once validated by all nodes $N_1$-$N_N$ in a step E8.

Such a copy of a last state of the local ledger of the node $N_N$ makes up the data of a reference transaction TR for the transactions relating to the function executed by the node $N_N$ intended to be memorized in the local ledger following emptying of the latter.

Thus, although its local ledger has been emptied, the node $N_N$ can still contribute to the distributed ledger and ensure the transparency and traceability of the transactions relating to the implementation of the provided service.

In a step E9, the node $N_N$ proceeds with a complete or partial emptying of its local ledger.

Figure 3:
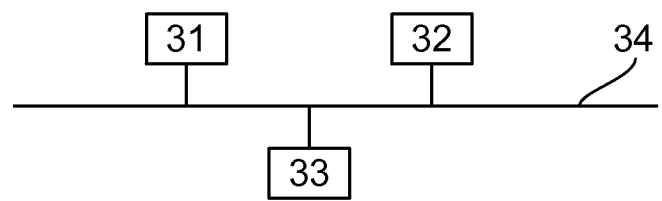
FIG. 3 shows a node according to an embodiment of the development.

FIG. 3 represents a node $N_1$-$N_N$ according to an embodiment of the development. Such a node $N_1$-$N_N$ is able to implement the different embodiments of the method for managing a local ledger according to FIG. 2.

A node $N_1$-$N_N$ may comprise at least one hardware processor 31, a storage unit 32, and at least one network interface 33 which are connected to each other via a bus 34. Of course, the constituent elements of the node $N_1$-$N_N$ may be connected by means of a connection other than a bus.

The processor 31 controls the operations of the node $N_1$-$N_N$. The storage unit 32 stores at least one program for the implementation of the method according to an embodiment of the development to be executed by the processor 31, and various data, such as parameters used for calculations performed by the processor 31, data of intermediate calculation performed by the processor 31, etc. The processor 31 may be formed by any known and suitable hardware or software, or by a combination of hardware and software. For example, the processor 31 may be formed by dedicated hardware such as a processing circuit, or by a programmable processing unit such as a central processing unit (Central Processing Unit) which executes a program stored in a memory of the latter.

The storage unit 32 may be formed by any suitable means capable of storing the program(s) and data in a computer-readable manner. Examples of a storage unit 32 include computer-readable non-transitory storage media such as solid-state memory devices, and magnetic, optical, or magneto-optical recording media loaded into a read and write unit.

The network interface 33 provides a connection between the node $N_1$-$N_N$ and other nodes $N_1$-$N_N$ and at least one archivist node $N_A$.

Figure 4:
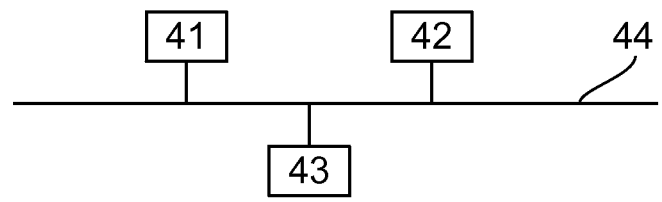
FIG. 4 shows an archivist node according to an embodiment of the development.

FIG. 4 shows an archivist node $N_A$ according to an embodiment of the development. Such an archivist node $N_A$ is able to implement the different embodiments of the method for managing a distributed ledger according to FIG. 2.

An archivist node $N_A$ may comprise at least one hardware processor 41, a storage unit 42, and at least one network interface 43 which are connected together throughout a bus 44. Of course, the constituent elements of the archivist node $N_A$ may be connected by means of a connection other than a bus.

The processor 41 controls the operations of the archivist node $N_A$. The storage unit 42 stores at least one program for the implementation of the method according to an embodiment of the development to be executed by the processor 41, and various data, such as parameters used for calculations performed by the processor 41, data of intermediate calculation performed by the processor 41, etc. The processor 41 may be formed by any known and suitable hardware or software, or by a combination of hardware and software. For example, the processor 31 may be formed by dedicated hardware such as a processing circuit, or by a programmable processing unit such as a central processing unit (Central Processing Unit) which executes a program stored in a memory of the latter.

The storage unit 42 may be formed by any suitable means capable of storing the program(s) and data in a computer-readable manner. Examples of a storage unit 42 include computer-readable non-transitory storage media such as solid-state memory devices, and magnetic, optical or magneto-optical recording media loaded into a read and write unit.

The network interface 43 provides a connection between the archivist node $N_A$, nodes $N_1$-$N_N$ and at least one other archivist node $N_A$.

The invention claimed is:

1. A method for managing a local ledger of a node belonging to a set of nodes contributing to an implementation of a service, the local ledger memorizing at least one first transaction comprising data generated during an execution, by the node, of a function contributing to the implementation of the service and at least one parameter proving the validity of the transaction and allowing adding the first transaction in a distributed ledger memorizing all of the transactions relating to the implementation of the service, the method being implemented by the node and comprising:
   receiving a message comprising an authorization to empty contents of the local ledger, the message being emitted by an archivist node, memorizing in an archivist node local ledger a copy of the transactions recorded in the distributed ledger;
   prior to emptying of the local ledger, recording a copy of a last state of the local ledger; and
   generating a second transaction serving as a reference transaction for the transactions intended to be memorized in the local ledger following the emptying, the data comprised in the second transaction depending on the copy of the last state of the local ledger.

2. The method according to claim 1, comprising verifying an authenticity of the message comprising the authorization to empty the contents of the local ledger by means of a reference transaction memorized in the distributed ledger, the reference transaction comprising at least one identifier of at least one authorized archiving node.

3. The method according to claim 1, comprising an emission step, to at least one archivist node, requesting authorization to empty the local ledger.

4. The method according to claim 3, wherein the message requesting authorization to empty the local ledger is emitted in response to detection of reaching a limit storage volume of the local ledger.

5. The method according to claim 1, wherein the message comprising the authorization to empty the contents of the local ledger is comprised in a transaction memorized in the distributed ledger.

6. The method according to claim 1, further comprising:
   verifying at least one condition for triggering emptying of the local ledger, the verification of the condition triggering an implementation of recording a copy of a last state of the local ledger.

7. The method according to claim 1, wherein the message comprising the authorization to empty the contents of the local ledger also comprises an identifier of the function.

8. The method according to claim 1, wherein, receiving the message comprising the authorization to empty the contents of the local ledger triggers execution of an archiving function leading to emptying of the local ledger.

9. The method according to claim 8, wherein the archiving function executed by the node is a smart contract.

10. A method for managing a distributed ledger memorizing all transactions relating to a service implemented by a set of nodes, a node executing at least one function contributing to the implementation of the service and comprising a local ledger memorizing at least one first transaction comprising data generated during an execution of the function and at least one parameter proving a validity of the transaction and allowing adding the first transaction in the distributed ledger, the method being implemented by an archivist node, memorizing in an archivist node local ledger a copy of the distributed ledger, the method comprising:
   detecting a triggering event relating to the distributed ledger;
   in response to the detection of the triggering event, broadcasting, to the nodes of the set of nodes contributing to the implementation of the service, a message comprising an authorization to empty the contents of the local ledger of the nodes of the set of nodes; and
   memorizing, in the archivist node local ledger, a new reference transaction of the nodes of the set of nodes having emptied the local ledger.

11. The method for managing a distributed ledger according to claim 10, wherein the triggering event belongs to a group comprising:
   a regular time interval,
   a reception of a message, emitted by at least one node of the set of nodes, requesting authorization to empty the local ledger of the at least one node,
   a time schedule,
   a number of transactions memorized in the distributed ledger,
   a limit storage volume,
   an update of the function to be executed,
   an addition of another node to the set of nodes,
   a deletion of a node from the set of nodes,
   an addition of another archivist node,
   a deletion of an archivist node.

12. A node belonging to a set of nodes contributing to an implementation of a service, and comprising a local ledger memorizing at least one first transaction comprising data generated during an execution, by the node, of a function contributing to the implementation of the service and at least one parameter proving a validity of the transaction and allowing adding the first transaction in a distributed ledger memorizing all of the transactions relating to the implementation of the service, the node comprising means for:
   receiving a message comprising an authorization to empty contents of the local ledger, the message being emitted by an archivist node, memorizing in an archivist node local ledger a copy of the transactions recorded in the distributed ledger;
   prior to emptying of the local ledger, recording a copy of a last state of the local ledger; and
   generating a second transaction serving as a reference transaction for the transactions intended to be memorized in the local ledger following the emptying, the data comprised in the second transaction depending on the copy of the last state of the local ledger.

13. An archivist node memorizing in an archivist node local ledger a copy of a distributed ledger memorizing all transactions relating to a service implemented by a set of nodes, a node executing at least one function contributing to the implementation of the service and comprising a local ledger memorizing at least one first transaction comprising data generated during an execution of the function and at least one parameter proving a validity of the transaction and allowing adding the first transaction in the distributed ledger, the archivist node comprising means for:
   detecting a triggering event relating to the distributed ledger;
   in response to the detection of the triggering event, broadcasting, to the nodes of the set of nodes contributing to the implementation of the service, a message comprising an authorization to empty contents of the local ledger of the nodes of the set of nodes; and
   memorizing, in the archivist node local ledger, a new reference transaction of the nodes of the set of nodes having emptied the local ledger.

14. A processing circuit comprising a processor and a memory, the memory storing program code instructions of a computer program for executing the method according to claim 1, when the computer program is executed by the processor.

15. A processing circuit comprising a processor and a memory, the memory storing program code instructions of a computer program for executing the method according to claim 10, when the computer program is executed by the processor.

* * * * *